United States Patent [19]

Patil et al.

[11] Patent Number: 5,108,809
[45] Date of Patent: Apr. 28, 1992

[54] ADHESIVE COMPOSITION FOR COATING METAL PIPES

[75] Inventors: Bhalchandra B. Patil, Burlington; Jordan D. Kellner, Wayland, both of Mass.

[73] Assignee: The Kendall Company, Mansfield, Mass.

[21] Appl. No.: 632,715

[22] Filed: Dec. 24, 1990

Related U.S. Application Data

[62] Division of Ser. No. 329,715, Mar. 28, 1989, abandoned.

[51] Int. Cl.$^5$ .............................................. F16L 58/00
[52] U.S. Cl. ................... 428/35.8; 428/36.8; 428/36.91; 428/35.9; 138/146; 138/DIG. 6; 138/DIG. 7
[58] Field of Search ............... 428/35.8, 35.9, 36.8, 428/36.91; 138/143, DIG. 6, 145, 146, DIG. 7

[56] References Cited

U.S. PATENT DOCUMENTS

| | | | |
|---|---|---|---|
| 4,091,134 | 5/1978 | Uemura et al. | 428/35.8 |
| 4,133,352 | 1/1979 | Koons | 428/35.8 |
| 4,213,486 | 7/1980 | Samour et al. | 428/35.9 |
| 4,287,034 | 9/1981 | Pieslak | 138/DIG. 6 |
| 4,455,204 | 6/1984 | Pieslak et al. | 428/35.9 |
| 4,472,231 | 9/1984 | Jenkins | 138/DIG. 6 |
| 4,507,340 | 3/1985 | Rinde | 138/143 |
| 4,606,953 | 8/1986 | Suzuki et al. | 428/35.9 |
| 4,645,697 | 2/1987 | Torigoe | 138/DIG. 6 |
| 4,933,235 | 6/1990 | Kellner | 428/355 |

*Primary Examiner*—Ellis P. Robinson
*Assistant Examiner*—Rena L. Dye
*Attorney, Agent, or Firm*—M. Maus

[57] ABSTRACT

Novel synthetic elastomer and/or natural rubber-based adhesive liquid coatings adapted for use as a primer coating for pipelines, which coatings include an amphipathic metal complexing reagent in an amount effective to provide protection against cathodic disbondment; and novel protective pipewrap systems including same.

4 Claims, No Drawings

ADHESIVE COMPOSITION FOR COATING METAL PIPES

This application is a division of application Ser. No. 329,715, filed Mar. 28, 1989 now abandoned.

BACKGROUND OF THE INVENTION

The present invention relates in general to coatings for protecting metal articles and more particularly to cathodic protection by synthetic elastomer and/or natural rubber coatings for pipelines intended for inground implantation.

Various protective pipeline coatings are well known in the art. In addition, federal regulations require that all major pipelines be cathodically protected in order to markedly decrease failures due to corrosion. Cathodic protection is defined as reduction or elimination of corrosion by making the metal a cathode by means of an impressed direct current or attachment to a sacrificial anode, usually magnesium, aluminum, or zinc.

While turning the entire structure into a cathode will eliminate corrosion in general, breaks and imperfections in the pipeline coating. do present special problems. Initially, such breaks or "holidays" are protected by the negative charge, yet with time and in part due to moisture and minerals in the soil, it is precisely this negative charge which accelerates undercutting and disbondment of the coating system in the areas of holidays.

For these reasons, the pipeline coating art has heretofore devoted considerable attention to the task of providing cathodic disbondment resistance to the various protective coating systems employed.

While not intended as a complete survey of the art of resisting cathodic disbondment, the following patents are believed to be fairly illustrative.

U.S. Pat. No. 3,876,606 issued to Kehr relates to thermosetting epoxy resin powders for coating metal articles which are said to exhibit exceedingly good resistance to disbondment. In accordance with the invention, the epoxy resin composition comprises a homogenous blend of a polyglycidyl ether of a polyhydric phenol having a softening point of 70°–120° C., a specified dihydrazide hardening agent, and, as the essential novelty, at least 15% by volume of barium sulfate and/or calcium carbonate, up to one-third of which may be substituted by mica powder.

According to the patentee, U.S. Pat. Nos. 3,102,043 and 3,578,615, cited therein, appear to indicate that certain fillers for powdered epoxy resin, especially mica powder, improve resistance to disbondment.

U.S. Pat. No. 4,009,224 issued to Warnken also relates to epoxy resin powders used to provide protective coatings, especially for petroleum pipelines, the essence of the invention apparently being incorporating a copolymer of vinyl acetate and ethylene.

U.S. Pat. No. 4,027,059 issued to Koons relates to specified asphalt-based compositions for coating and for patching coatings on pipelines consisting of a precursor composition comprising asphalt, at least one polyhydroxy polymer, at least one polyhydroxy compound, at least one polyamine, at least one solvent and optionally, at least one filler. This precursor composition, where combined with at least one polyisocyanate is said to form a composition especially useful for coating and for patch coating and which is said to provide resistance to cathodic disbonding upon cure.

U.S. Pat. No. 4,133,352 also issued to Koons relates to primer coatings for asphalt-based pipe coatings which will improve the properties of the asphalt-based coatings, particularly their hot line adhesion and cathodic disbonding resistance. The primer coating comprises a solution of chlorinated rubber and aromatic petroleum pitch in a solvent.

U S. Pat. No. 4,192,697 describes a method for protecting pipes which is said to exhibit no loss of bond when tested in accordance with ASTM G8-69T, which method comprises wrapping helically over the pipe a hot fabric strip impregnated with a hot molten adhesive, e.g. asphaltic bitumen, coal tar or rubber containing asphaltic bitumen and coal tar, and then overwrapping with a strip of plasticized polyvinyl chloride sheet, under tension, to form a sheathing.

U.S. Pat. No. 4,213,486 issued to Samour et al (and assigned to the assignee of the instant application) describes a pipewrap system having improved cathodic disbondment properties wherein the pipe is first coated with an epoxy and thereafter a flexible tape outerwrap is applied, the tape preferably being a hot melt or pressure-sensitive adhesive carried on a polyolefinic layer.

U.S. Pat. No. 4,455,204 discloses an adhesive coating for pipes having improved resistance to cathodic disbondment comprising an adhesive component and a specified hydrazine derivative.

U.S. Pat. No. 4,523,141 and a division thereof, 4,589,275, both issued to Thomas et al and assigned to the instant assignee, is directed to test procedures for determining whether the outer barrier layer in a pipewrap system is in fact free from pinholes or other small discontinuities which can induce cathodic disbondment, so that any necessary repairs can be made before the pipe is laid in the ground. In acccordance with the claims of the parent case, U.S. Pat. No. 4,523,141, the method for detecting pinholes in a pipecoating having a thermal insulating layer and an outer barrier layer by measuring electrical conductivity or resistivity along the face of the barrier layer, is improved if an electroconductive intermediate layer is interposed between and bonded to, the insulating and barrier layers. In accordance with the divisional case, U.S. Pat. No. 4,589,275, the intermediate layer for facilitating testing can be electroconductive, smooth surfaced or of a color contrasting to the barrier layer.

As was previously alluded to, the aforementioned patents are not intended to constitute a comprehensive state of the art pertaining to prevention of cathodic disbondment. They are, however, considered to be fairly illustrative of the state of the art known to applicant.

Particularly efficacious systems for protecting metal pipes and the like are those comprising a rubber-based primer coating and an adhesive tape outerwrap. While these rubber-based pipewraps provide exceptionally fine protection against corrosion and other degradative environmental forces, the cathodic protection voltage applied to the inground pipeline will nevertheless cause at least some cathodic disbondment to occur. Accordingly, there is a need for some means for inhibiting or preventing cathodic disbondment in pipewrap systems.

The task of this invention may accordingly be said to be to provide protection against cathodic disbondment to a pipewrap system comprising a synthetic elastomer and/or natural rubber primer coating applied to the surface of the pipe and an outer rubber-based adhesive tape wrapped over the primer coating.

BRIEF DESCRIPTION OF THE INVENTION

In accordance with the present invention, the aforementioned task is solved by providing a synthetic elastomer and/or natural rubber based liquid coating comprising an organic solution of synthetic elastomer and/or natural rubber, a tackifier and an amphipathic metal complexing cathodic disbondment inhibitor. As used herein and in the appended claims the term "cathodic disbondment inhibitor" means a reagent which prevents corrosion of metal articles.

More specifically, the cathodic disbondment inhibitor is a weak acid and a reducing agent. Most preferably, however, the cathodic disbondment inhibitor consists essentially of the resin formed by self-condensation of a sterically hindered phenol of the formulae:

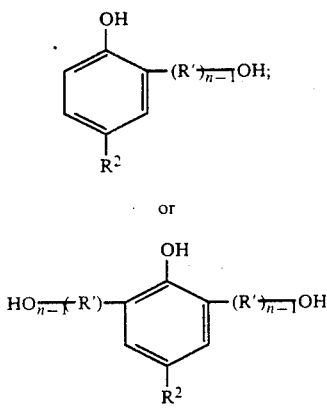

wherein $R^1$ is an alkyl group having 1-4 carbon atoms; n is 1 or 2; and $R^2$ is alkyl or arylalkyl wherein the alkyl moiety contains at least 8 carbon atoms.

DETAILED DESCRIPTION OF THE INVENTION

The present invention is in general directed to the task of producing a cathodic disbondment resistant coating, and is specifically directed to preventing cathodic disbondment in a synthetic elastomer and/or natural rubber based pipewrap systems for protecting metal pipes in the ground. Such systems include a synthetic elastomer and/or natural rubber-based primer coating which is first applied to the surface of the metal pipe by spraying, brushing, dipping or rugging and a rubber based adhesive tape which is then wound over the previously applied primer coating.

While not limited thereto, for purposes of illustration a typical rubber-based primer coating will comprise a solution or dispersion of natural rubber and at least one tackifier in a volatile solvent.

A typical rubber-based adhesive tape will comprise a suitable backing material, e.g. a polyolefin such as polyethylene carrying a layer of a butyl rubber coating, e.g. a blend or homogenous mixture of virgin butyl rubber and/or halogenated butyl rubber alone or in combination with butyl rubber and at least one tackifying resin. As is well known in the art, the adhesive coating may also contain various additives providing specific desired functions such as antioxidants, bactericides, fillers, pigments, etc.

In accordance with the present invention, the rubber-based primer coating will also include an effective amount of a cathodic disbondment inhibitor comprising an amphipathic metal complexing reagent. More specifically, the cathodic disbondment inhibitor is a weak acid and a reducing agent. Most preferably, however, the cathodic disbondment inhibitor consists essentially of the resin formed by self-condensation of a sterically hindered phenol of the aforementioned formulae.

The preferred uncondensed phenolic resin is a heat reactive resin of the following formula:

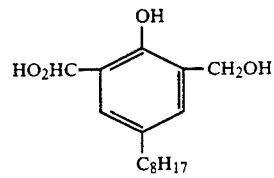

While not wishing to be bound by any particular theory, the applicant proposes the following hypotheses to explain the substantially decreased cathodic disbondment evidenced by the test results, shown in tablular form hereinafter.

First, the phenolic functional group (—OH) exhibits preferential adhesive properties toward the metal surface by complexing with metal ions and oxides. Second, the methylol group(s) (—$CH_2OH$) self condense upon heating to form polymers, which by their very nature of being higher molecular weight phenols are moisture resistant and hence protect the metal surface from moisture accumulation. In addition, the methylol group(s) and the phenol group may also react with the metal surface to form a five membered ring comprising metal oxide complexes and thereby increase the cohesive strength of the polymer/metal oxide interface. Lastly, the para-located aliphatic chain (—R) imparts hydrophobicity. These hypotheses are supported by the following data.

When the self-condensation product of di-ortho methylol, para octyl phenol, a phenol of the preferred formula, was coated onto steel plates, it inhibited wetting by aqueous solutions either in the neutral or basic pH range. For example, the contact angle of one molar sodium hydroxide on di-ortho methylol, para octyl, phenol treated steel was 76±3° as compared to 39±2° on untreated steel. Consequently, the contact angle remained stable after six repeated washings.

These tests suggest that the self-condensation product of di-ortho methylol, para octyl phenol inhibits hydroxide induced debonding by preventing the spreading of hydroxide molecules at the primer-metal interface.

Secondly, a sterically hindered oligomeric phenol is both a weak acid and a reducing agent. Consequently, as a weak acid it would consume hydroxide generated by cathodic reactions at the primer/metal interface and as a reducing agent, it would scavenge oxidizing species thereby lowering the concentration of hydroxide at the interface and consequently inhibit cathodic disbondment. In sum, when a primer containing a cathodic disbondment inhibitor is applied to a pipe surface, the phenolic group and/or methylol groups forms a strong bond with the metal pipe surface by metal complexation while the methylol groups undergo self condensation and form a coherent film over the metal surface so as to prevent surface wetting, which in turn is enhanced by the para alkyl group.

Lastly, complexation of metal ions by phenolic resins has been documented both during the polymerization process and as a diagnostic tool for resin reactivity S.

Chaberek and A. E. Martell, *Organic Sequestering Agents*, John Wiley, N.Y. (1959); F. P. Dwyer and D. P. Mellor, *Chelating Agents and Metal Chelates*, Academic Press (1969). Thus when applicant added Fe(III) ions to a methyl alcohol solution of the self-condensation product of di-ortho methylol, para octyl phenol a brilliant blue color was noted which suggests that the phenolic resin has formed a complex with Fe(III) ions. Applicant believes that di-ortho methylol, para octyl phenol forms complexes of metal ions and metal oxides at the primer/metal interface and thereby inhibits cathodic disbonding by increasing adhesion in the presence of a basic environment.

In sum, when a primer containing a cathodic disbondment inhibitor is applied to a pipe surface, the phenolic and/or methylol group(s) form a strong bond with the metal pipe surface by metal complexation while the methylol group(s) undergo self-condensation and form a coherent film over the metal surface so as to prevent surface wetting, which is further prevented by the para alkyl group.

Phenolic resins known in the art may be substituted or non-substituted. They may be heat-reactive or non-heat-reactive. As is reported in the literature, depending on the nature of the resin, it may be used alone or as a modifying resin, where it may act as an adhesion promotor, chemical cross-linker or hardening agent, *Encyclopedia of Polymer Science and Engineering*, 2nd Edition pg 75-78.(1988)

The literature further teaches that heat-reactive resins are more compatible with other polar-coating resins such as amino, epoxy, and poly vinyl butyral, than the oil-soluble resins,id at 75. The present invention incorporates a non polar resin, making the previous recitation a negative teaching.

Moreover, even though heat-reactive resins are used in interior can and drum linings, metal primers, and pipe coatings, the literature teaches that "[S]trong alkalies should be avoided" since strong alkalies would dissolve the coating. Notably the present invention contrary to the literature, directly exposes the heat-reactive resin to cathodic protection, i.e. an alkaline environment.

In addition Novolacs, thermoplastic phenol-formaldehyde type resins are known as epoxy hardeners and an epoxy-phenolic complex has found application as a powder coating of pipes for corrosion resistance (see previously described patents). Moreover, epoxy phenolic solutions are used as metal primers and specifically as pipe coatings.

The present invention distinguishes over the aforementioned prior art in that it adds a substituted/sterically hindered, heat-reactive phenolic resin to form a solution of a primer coating. It therefore distinguishes over epoxy-phenolic systems in that it does not employ epoxy nor is it a powder coating, which are markedly less effective in inhibiting cathodic disbondment than liquid coatings. Moreover, substituted heat reactive resins are most widely used in contact-adhesive applications, and to a lesser extent as coatings. They are particularly not used for air-dry coatings, as is the case with the present invention, because of their soft, tacky nature in the uncured state. *Encyclopedia of Polymer Science and Engineering*, 2nd Ed. pg.76 vol.11.

In sum and in its broadest aspect, the present invention is directed to anti-cathodic disbondment agents for metal coatings in general, and specifically to synthetic elastomer and/or natural rubber pipeline coatings. Thus the invention is to be employed as an additive to the currently used rubber-based coating systems.

The currently used rubber based adhesives may contain a wide variety of component materials such as elastomers, resins, or tackifiers, fillers, plasticizers and softeners, antioxidants, curing agents, sequestering agents, biocides, etc.

The elastomer may be defined as a polymeric material having rubber-like properties. More specifically, an elastomer is a natural or synthetic polymer which exhibits high extensibility and quick, forceful recovery. The preferred elastomer is Butyl rubber.

Irrespective of the particular elastomer or blend of elastomers employed the formulation for the primer coating as well as for the tape will also include at least one tackifying resin specific to the elastomer and/or rubber used for increased adhesion. As examples of such tackifiers heretofore known and marketed to the adhesive industry for such purposes, mentioned may be made of the following: rosins such as gum, wood or tall oil rosin; modified rosins, e.g. polymerized rosin or hydrogenated rosin; rosin esters such as pentaerythritol-wood rosin, glycerine-hydrogenated rosin, glycerine-highly stabilized rosin, and a pentaerythritol-highly stabilized rosin; polymerized petroleum hydrocarbons, e.g. cycloaliphatic hydrogenated olefins, olefins, aliphatic petroleum hydrocarbons, modified aromatic hydrocarbons, dicyclopentadiene, mixed olefins, alkyl-aromatic petroleum hydrocarbons, modified aromatic hydrocarbons; polymerized terpenes such as alpha-pinene, d-limonene, beta-pinene, terpene, etc.; miscellaneous resins such as alph-methyl styrene-vinyltoluene, alpha-methyl styrene, styrene, terpene phenolic, coumarone-indenes, etc.; and metallic resinates such as mixed calcium/zinc (e.g. Pexate 329, Pexate 549, Zitro, Zirex or Zinar) and zinc resinates (such as Pexate 511, Pexate 510E or Pexate 508 E), etc.

As previously noted, the adhesive formulations may typically include other materials performing specific desired functions. As illustrations of such additives, mentioned may be made of fillers such as carbon black, zinc oxide, clays, chalk, whitings, calcium silicate, barium sulfate and the like in order to reduce the cost, increase the specific gravity, and/or to raise the viscosity; plasticizers and softeners such as mineral oil, lanolin, etc.; antioxidants, e.g. aromatic amine antioxidants, substituted phenols, hydroquinone (p-dihydroxygenzene), etc.; curing agents such as sulfur, organic peroxides and the like; accelerators; sequestering agents; biocides such as bactericides, etc.

By way of recapitulation, the present invention is applicable to the per se known synthetic elastomer and/or natural rubber-based pipe wrap systems comprising a primer coating applied to the metal pipe surface and an overlying adhesive tape wrapped over the primer coating, e.g. spirally wound over the primer, to provide a protective coating for the pipe. The essence of the invention therefore, is the concept of including in the primer coating at least one anti-cathodic disbonding agent of the foregoing description in an amount effective to reduce cathodic disbondment materially.

The primer coating of this invention may be prepared in known manner by forming a solution or homogenous dispersion of the individual components in a suitable volatile organic solvent or mixture of solvents, e.g. heptane, toluene, etc.

The following examples show by way of illustration and not by way of limitation the practice of the present invention in inhibiting cathodic disbondment. The following primer coatings were prepared similar to that described in Col. 6 of the aforementioned U.S. Pat. No. 4,472,231;

|  | phr | % by Wt |
|---|---|---|
| Group I-(Samples Comprising Chlorobutyl Rubber) | | |
| *Example 1* | | |
| Chlorobutyl rubber | 100.00 | 7.61% |
| Anti-oxidant | 1.00 | 0.08% |
| Anti-oxidant | 1.00 | 0.08% |
| Self-condensation product of Di-ortho methylol, para octyl phenol | 7.00 | 0.53% |
| Hydrocarbon tackifier | 150.00 | 11.42% |
| Brominated phenolic resin | 0.00 | 0.00% |
| ZnO | 3.50 | 0.27% |
| Toluene | 66.00 | 5.02% |
| Heptane | 985.00 | 74.99% |
|  | 1313.5 | 100.00% |
| *Example 2* | | |
| Chlorobutyl rubber | 100.00 | 9.38% |
| Anti-oxidant | 1.00 | 0.09% |
| Anti-oxidant | 1.00 | 0.09% |
| Self-condensation product of Di-ortho methylol, para octyl phenol | 0.00 | 0.00% |
| Hydrocarbon tackifier | 100.00 | 9.38% |
| Brominated phenolic resin | 7.00 | 0.66% |
| ZnO | 3.50 | 0.33% |
| Toluene | 54.00 | 5.06% |
| Heptane | 800.00 | 75.01% |
|  | 1066.50 | 100.00% |
| *Example 3* | | |
| Chlorobutyl rubber | 100.00 | 7.61% |
| Anti-oxidant | 1.00 | 0.08% |
| Anti-oxidant | 1.00 | 0.08% |
| Self-condensation product of Di-ortho methylol, para octyl phenol | 0.00 | 0.00% |
| Hydrocarbon tackifier | 150.00 | 11.42% |
| Brominated phenolic resin | 7.00 | 0.53% |
| ZnO | 3.50 | 0.27% |
| Toluene | 66.00 | 5.02% |
| Heptane | 985.00 | 74.99% |
|  | 1313.5 | 100.00% |
| Group II-(Samples Comprising Butyl Rubber) | | |
| *Example 1* | | |
| Butyl rubber | 100.00 | 11.29% |
| Anti-oxidant | 1.00 | 0.11% |
| Anti-oxidant | 1.00 | 0.11% |
| Self-condensation product of Di-ortho methylol, para octyl phenol | 0.00 | 0.00% |
| Hydrocarbon tackifier | 75.00 | 8.47% |
| Toluene | 44.00 | 4.97% |
| Heptane | 665.00 | 75.05% |
|  | 886.00 | 100.00% |
| *Example 2* | | |
| Butyl rubber | 100.00 | 11.29% |
| Anti-oxidant | 0.00 | 0.00% |
| Anti-oxidant | 0.00 | 0.00% |
| Self-condensation product of Di-ortho methylol, para octyl phenol | 1.80 | 0.20% |
| Hydrocarbon tackifier | 75.00 | 8.47% |
| Toluene | 44.00 | 4.97% |
| Heptane | 665.00 | 75.07% |
|  | 885.80 | 100.00% |
| *Example 3* | | |
| Butyl rubber | 100.00 | 10.70% |
| Anti-oxidant | 1.00 | 0.11% |
| Anti-oxidant | 1.00 | 0.11% |
| Self-condensation product of Di-ortho methylol, para octyl phenol | 9.30 | 1.00% |
| Hydrocarbon tackifier | 75.00 | 8.04% |
| Toluene | 47.00 | 5.04% |
| Heptane | 700.00 | 75.00% |
|  | 933.30 | 100.00% |
| *Example 4* | | |
| Butyl rubber | 100.00 | 10.13% |
| Anti-oxidant | 1.00 | 0.10% |
| Anti-oxidant | 1.00 | 0.10% |
| Self-condensation product of Di-ortho methylol, para octyl phenol | 19.70 | 2.00% |
| Hydrocarbon tackifier | 75.00 | 7.60% |
| Toluene | 50.00 | 5.07% |
| Heptane | 740.00 | 75.00% |
|  | 986.70 | 100.00% |
| Group III-(Samples Comprising Thermoplastic Rubber) | | |
| *Example 1* | | |
| Thermo plastic rubber | 100.00 | 10.13% |
| Anti-oxidant | 1.00 | 0.10% |
| Anti-oxidant | 1.00 | 0.10% |
| Self-condensation product of Di-ortho methylol, para octyl phenol | 19.70 | 2.00% |
| Terpene phenolic tackifier | 75.00 | 7.60% |
| Salicylanilide | 0.04% | 0.00% |
| Toluene | 50.00 | 5.07% |
| Heptane | 740.00 | 75.00% |
|  | 986.74 | 100.00% |
| *Example 2* | | |
| Thermo plastic rubber | 100.00 | 8.99% |
| Anti-oxidant | 1.00 | 0.09% |
| Anti-oxidant | 1.00 | 0.09% |
| Self-condensation product of Di-ortho methylol, para octyl phenol | 44.50 | 4.00% |
| Terpene phenolic Resin | 75.00 | 6.74% |
| Salicylanilide | 0.04 | 0.01% |
| Toluene | 56.00 | 5.03% |
| Heptane | 835.00 | 75.05% |
|  | 1112.54 | 100.00% |
| Group IV-(Samples Comprising Butyl Rubber and Salicylanilide) | | |
| *Example 1* | | |
| Butyl Rubber | 100.00 | 10.13% |
| Anti-oxidant | 1.00 | 0.10% |
| Anti-oxidant | 1.00 | 0.10% |
| Self-condensation product of Di-ortho methylol, para octyl phenol | 19.70 | 2.00% |
| Hydrocarbon tackifier | 75.00 | 7.60% |
| Salicylanilide | 0.04 | 0.01% |
| Toluene | 50.00 | 5.07% |
| Heptane | 740.00 | 74.99% |
|  | 986.74 | 100.00% |
| *Example 2* | | |
| Butyl rubber | 100.00 | 8.94% |
| Anti-oxidant | 1.00 | 0.09% |
| Anti-oxidant | 1.00 | 0.09% |
| Self-condensation product of Di-ortho methylol, para octyl phenol | 44.80 | 4.00% |
| Hydrocarbon tackifier | 75.00 | 6.70% |
| Salicylanilide | 0.04 | 0.01% |
| Toluene | 57.00 | 5.09% |
| Heptane | 840.00 | 75.08% |
|  | 1118.84 | 100.00% |
| Group V-(Samples Comprising Natural Rubber) | | |
| *Example 1* | | |
| Natural Rubber | 100.00 | 9.62% |
| Anti-oxidant | 1.00 | 0.10% |
| Anti-oxidant | 1.00 | 0.10% |
| Self-condensation product of Di-ortho methylol, para octyl phenol | 20.80 | 2.00% |
| Zinc Resinate | 85.00 | 8.17% |
| Salicylanilide | 0.04 | 0.01% |
| Toluene | 52.00 | 5.00% |
| Heptane | 780.00 | 75.01% |
|  | 1039.84 | 100.00% |

-continued

|  | phr | % by Wt |
|---|---|---|
| Example 2 | | |
| Natural rubber | 100.00 | 8.57% |
| Anti-oxidant | 1.00 | 0.09% |
| Anti-oxidant | 1.00 | 0.09% |
| Self-condensation product of Di-ortho methylol, para octyl phenol | 46.70 | 4.00% |
| Zinc resinate | 85.00 | 7.28% |
| Salicylanilide | 0.04 | 0.01% |
| Toluene | 58.50 | 5.01% |
| Heptane | 875.00 | 74.96% |
|  | 1167.24 | 100.00% |

Following the preparation of the aforementioned primer coatings, Example 1-14 were tested in accordance with the standard test procedure of "The American Society for Testing and Materials for Cathodic Disbonding of Pipeline Coatings", ASTM G8-85.

In this test procedure, a steel pipe having a two inch (5 cm) diameter and 24 inches (61 cm) long was first coated with a primer coating, after which the Polyken 980-25 tape was machine wrapped over the coated pipe. Three holidays a quarter of an inch (0.64 cm) in diameter were drilled through the tape exposing the bare metal surface about 4 inches (10 cm) apart and 4 inches from the bottom seal. Each holiday is cleaned with a swab soaked in heptane to remove all primer coating from the steel pipe. The test is conducted in 25 gallons (95L) of electrolyte (1% each of sodium chloride, sodium sulfate and sodium carbonate) held in a plastic container, two feet (61 cm) in diameter. The test sample is suspended in the electrolyte and is electrically connected to a magnesium anode. A potential of $-1.5$ volts is established and this potential is maintained for a thirty (30) day test period at which time the sample is removed and the disbonded portion of the system cut away. The averaged disbonded area measured for the three holidays is recorded. Additional measurements are obtained at 60 days and at 90 days in the same fashion.

The following typical test data were obtained for 7 day, 30 day, 60 day, and 90 day intervals at room temperature.

| EXAMPLE | 7 DAY CD (in²) | 30 DAY CD (in²) | 60 DAY CD (in²) | 90 DAY CD (in²) |
|---|---|---|---|---|
| Group I | | | | |
| 1. | 0.30 | 0.75 | 3.23 | 5.30 |
| 2. | 0.20 | 0.77 | 2.93 | 4.60 |
| 3. | 0.18 | 1.08 | 4.40 | 7.03 |
| Group II | | | | |
| 1. | 0.27 | 1.35 | 4.58 | 8.30 |
| 2. | 0.18 | 1.07 | 3.22 | 6.70 |
| 3. | 0.16 | 0.61 | 1.25 | 1.86 |
| 4. | 0.08 | 0.40 | 0.85 | 1.10 |
| Group III | | | | |
| 1. | 0.14 | 0.32 | 1.84 | 2.81 |
| 2. | 0.13 | 0.23 | 1.03 | 2.53 |
| Group IV | | | | |
| 1. | 0.09 | 0.10 | 0.32 | 0.83 |
| 2. | 0.10 | 0.09 | 0.18 | 0.35 |
| Group V | | | | |
| 1. |  | 0.52 | 1.21 | 2.04 |
| 2. |  | 0.41 | 0.54 | 0.80 |

From the foregoing data, it will be observed that cathodic disbondment within each group is inhibited with the addition of the phenolic resin. Notably, cathodic disbondment is dependent on the type of rubber used since each rubber has its own intrinsic cathodic disbondment properties. Therefore, it is extremely advantageous to have a universal cathodic disbondment inhibitor which enhances the intrinsic cathodic disbondment properties of many rubber compounds. The phenolic resins of the present invention, appear to universally invoke a metal/surface interface mechanism thereby universally reducing the intrinsic cathodic disbondment properties of individual rubber compounds. Optimal cathodic disbondment inhibition is noted with amounts of phenolic resin starting from 1% and upwards.

Since certain changes may be made without departing from the scope of the invention herein described, it is intended that all matter contained in foregoing description, including the examples, shall be taken as illustrative and not in a limiting sense.

What is claimed is:

1. An article of manufacture comprising a metal pipe, the surface of which is coated with an adhesive composition comprising a mixture of solid components including at least one synthetic elastomer and/or natural rubber compound, said composition further including an effective amount of an amphipathic metal complexing cathodic disbondment inhibitor consisting essentially of the resin formed by self-condensation of a sterically hindered phenol of the following formula:

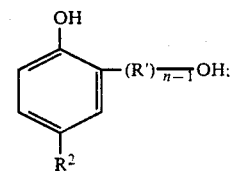

or

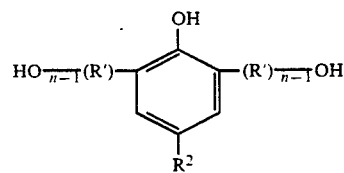

2. The article of manufacture as described in claim 1, wherein said amphipathic metal complexing cathodic disbondment inhibitor consists essentially of the following resin

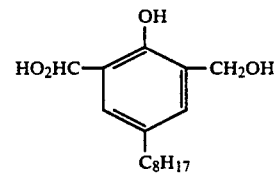

3. The article of manufacture as described in claim 1, further comprising a tackifier.

4. The article of manufacture as described in claim 1 including an adhesive tape covering said adhesive coating.

* * * * *